(12) United States Patent
Ohie et al.

(10) Patent No.: US 8,745,420 B2
(45) Date of Patent: *Jun. 3, 2014

(54) SEMICONDUCTOR DEVICE FOR SUPPLYING POWER SUPPLY VOLTAGE TO SEMICONDUCTOR DEVICE

(71) Applicant: Lapis Semiconductor Co., Ltd., Yokohama (JP)

(72) Inventors: Mitsuya Ohie, Kanagawa (JP); Kyotaro Nakamura, Tokyo (JP); Shuichi Hashidate, Tokyo (JP)

(73) Assignee: Lapis Semiconductor Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/786,532

(22) Filed: Mar. 6, 2013

(65) Prior Publication Data

US 2013/0185575 A1    Jul. 18, 2013

Related U.S. Application Data

(60) Division of application No. 12/649,480, filed on Dec. 30, 2009, now Pat. No. 8,407,491, which is a division of application No. 11/231,824, filed on Sep. 22, 2005, now Pat. No. 7,664,969, which is a continuation of application No. 09/946,512, filed on Sep. 6, 2001, now Pat. No. 6,971,032.

(30) Foreign Application Priority Data

Sep. 29, 2000    (JP) .................................. 2000-299675

(51) Int. Cl.
*G06F 1/26* (2006.01)

(52) U.S. Cl.
USPC ............ 713/300; 713/320; 713/323; 713/324

(58) Field of Classification Search
USPC .................................. 713/300, 320, 323, 324
See application file for complete search history.

(56) References Cited

U.S. PATENT DOCUMENTS

| 5,616,943 A | 4/1997 | Nguyen et al. |
| 5,938,770 A | 8/1999 | Kim |

(Continued)

FOREIGN PATENT DOCUMENTS

| JP | 09-135030 A | 5/1997 |
| JP | 10-256515 A | 9/1998 |

(Continued)

OTHER PUBLICATIONS

National Semiconductor, "USBN9602 (Universal Serial Bus) Full Speed Function Controller With DMA Support", Nov. 1998.

(Continued)

*Primary Examiner* — Vincent Tran
(74) *Attorney, Agent, or Firm* — Volentine & Whitt, PLLC

(57) ABSTRACT

A semiconductor device includes first, second and third power supply terminals respectively supplied with first, second and third power supply voltages. The semiconductor device also includes a first terminal connectable to a host device and a second terminal connectable to a peripheral device. The semiconductor device also includes a first circuit block connected to the first terminal and the first power supply terminal and receiving data output from the host device based on the first power supply voltage, a second circuit block connected to the second terminal and the third power supply terminal and receiving data output from the peripheral device based on the third power supply voltage, and a third circuit block connected to the second power supply terminal and controlling operation of the first circuit block and the second circuit block based on the second power supply voltage.

5 Claims, 8 Drawing Sheets

(56) References Cited

U.S. PATENT DOCUMENTS

| | | |
|---|---|---|
| 6,025,737 A | 2/2000 | Patel et al. |
| 6,105,143 A | 8/2000 | Kim |
| 6,137,144 A | 10/2000 | Tsao et al. |
| 6,182,497 B1 * | 2/2001 | Krajci .................. 73/23.2 |
| 6,236,549 B1 | 5/2001 | Peleska |
| 6,366,506 B1 | 4/2002 | Mizuno et al. |
| 6,400,542 B1 | 6/2002 | Lee et al. |
| 6,472,903 B1 | 10/2002 | Veenstra et al. |
| 6,662,301 B1 | 12/2003 | Sekine et al. |
| 6,711,071 B2 | 3/2004 | Mizuno et al. |
| 6,753,921 B1 | 6/2004 | Shimizu |
| 6,904,532 B2 | 6/2005 | Matsumoto |
| 6,938,108 B2 | 8/2005 | Ohie et al. |
| 6,971,032 B2 * | 11/2005 | Ohie et al. ............... 713/300 |
| 7,664,969 B2 | 2/2010 | Ohie et al. |
| 2002/0083235 A1 * | 6/2002 | Armitage ................. 710/62 |

FOREIGN PATENT DOCUMENTS

| | | |
|---|---|---|
| JP | 10285826 | 10/1998 |
| JP | 11143446 | 5/1999 |
| JP | 11353061 | 12/1999 |
| JP | 2000184264 A | 6/2000 |
| JP | 2000196945 | 7/2000 |

OTHER PUBLICATIONS

Japanese Office Action dated Dec. 6, 2013.

* cited by examiner

SEMICONDUCTOR DEVICE FOR SUPPLYING POWER SUPPLY VOLTAGE TO SEMICONDUCTOR DEVICE

CROSS-REFERENCE TO RELATED APPLICATIONS

This is a divisional application of application Ser. No. 12/649,480, filed on Dec. 30, 2009, now U.S. Pat. No. 8,407,491, which is a divisional application of application Ser. No. 11/231,824, filed on Sep. 22, 2005, now U.S. Pat. No. 7,664,969, which is a continuation application of application Ser. No. 09/946,512, filed on Sep. 6, 2001, now U.S. Pat. No. 6,971,032, which are hereby incorporated for all purposes.

BACKGROUND OF THE INVENTION

1. Field of the Invention

The present invention relates to a semiconductor device that controls communication of data performed between a host device, such as a personal computer (Personal Computer), and a peripheral device, such as a printer, a digital camera, and a digital audio player. Especially, the present invention relates to the semiconductor device for the technology performed using Universal Serial Bus (it is called USB hereinafter) with suitable data communications between the host device and the peripheral device. Furthermore, the present invention relates to a method for supplying a power supply voltage to such semiconductor device.

This application is counterpart of Japanese patent application Serial Number 299675/2000, filed Sep. 29, 2000, the subject matter of which is incorporated herein by reference.

2. Description of the Related Art

In recent years, a demand for a portable digital audio player etc. as a portable device has increased rapidly. Such portable device is mainly includes a mounting board, a USB connector mounted on the mounting board, and a slot which can connect memories, such as a flash memory. Further, a controller IC is mounted on this mounting board. The controller IC is made up of a USB control circuit (it is also called USB transceiver), a microcontroller unit (it is called MCU hereinafter), and an I/O block that performs the interface with an external device, such as Flash memory. These circuits are integrated into one chip as the controller IC. This mounting board is built in the digital audio player.

The USB connector can connect the USB and thus the PC as the host device and are connected to the portable device through the USB.

The USB control circuit has a function to receive data from the USB and a function which outputs data to the USB.

The MCU issues predetermined directions to the USB control circuit and the I/O block so that these circuits can perform a predetermined operation.

Peripheral parts, i.e., memories such as Flash memory which stores music data etc., are connected to the slot.

The music data stored in the PC is transferred to the portable device through the USB under control of the PC, and transferred music data is stored in the Flash memory through the USB control circuit based on control of the MCU. Moreover, data stored in the Flash memory is transferred to the PC through the MCU, the USB control circuit, and the USB under control of the MCU, and transferred music data is stored in the PC. As described above, the USB is used to transfer contents data, such as music data, between the PC and the portable device.

Although the above portable devices are portable therefore, they are driven by a battery. Therefore, in order to reduce consumption of a battery, an operation voltage in the portable device must be set up low. Here, the operation voltage means that the power supply voltage supplied to the portable device.

However, since the operation voltage of the USB control circuit and the Flash memory is standardized, the operation voltage of the peripheral part cannot disregard this standardized operation voltage, and cannot set it low. That is, the minimum operation voltage of the peripheral part depends on the standardized operation voltage of the USB control circuit and the I/O block.

Therefore, the further lower power consumption of the whole peripheral device (whole digital audio player) cannot be expected. Especially, since the USB control circuit operates in response to a clock signal having relatively high frequency while data communications are performed using the USB, consuming battery power is hard. Consequently; the semiconductor device having improved power consumption has been desired.

SUMMARY OF THE INVENTION

It is an object of the present invention is to provide a semiconductor device having improved power consumption.

It is still another object of the present invention is to provide a method for supplying a power supply voltage, which can reduce power consumption.

According to one aspect of the present invention, for achieving one or more of the above objects, there is provided a semiconductor device that includes a first power supply terminal which is supplied with a first power supply voltage, a second power supply terminal which is supplied with a second power supply voltage, and a third power supply terminal which is supplied with a third power supply voltage. The semiconductor device also includes a first terminal which is connectable to a host device and a second terminal which is connectable to a peripheral device. The semiconductor device also includes a first circuit block which is connected to the first terminal and the first power supply terminal and which receives a data outputted from the host device based on the first power supply voltage, a second circuit block which is connected to the second terminal and the third power supply terminal and which receives a data outputted from the peripheral device based on the third power supply voltage, and a third circuit block which is connected to the second power supply terminal and which controls operation of the first circuit block and the second circuit block based on the second power supply voltage.

The above and further objects and novel features of the invention will more fully appear from the following detailed description, appended claims and the accompanying drawings.

DETAILED DESCRIPTION OF THE PREFERRED EMBODIMENTS

Figure 1:
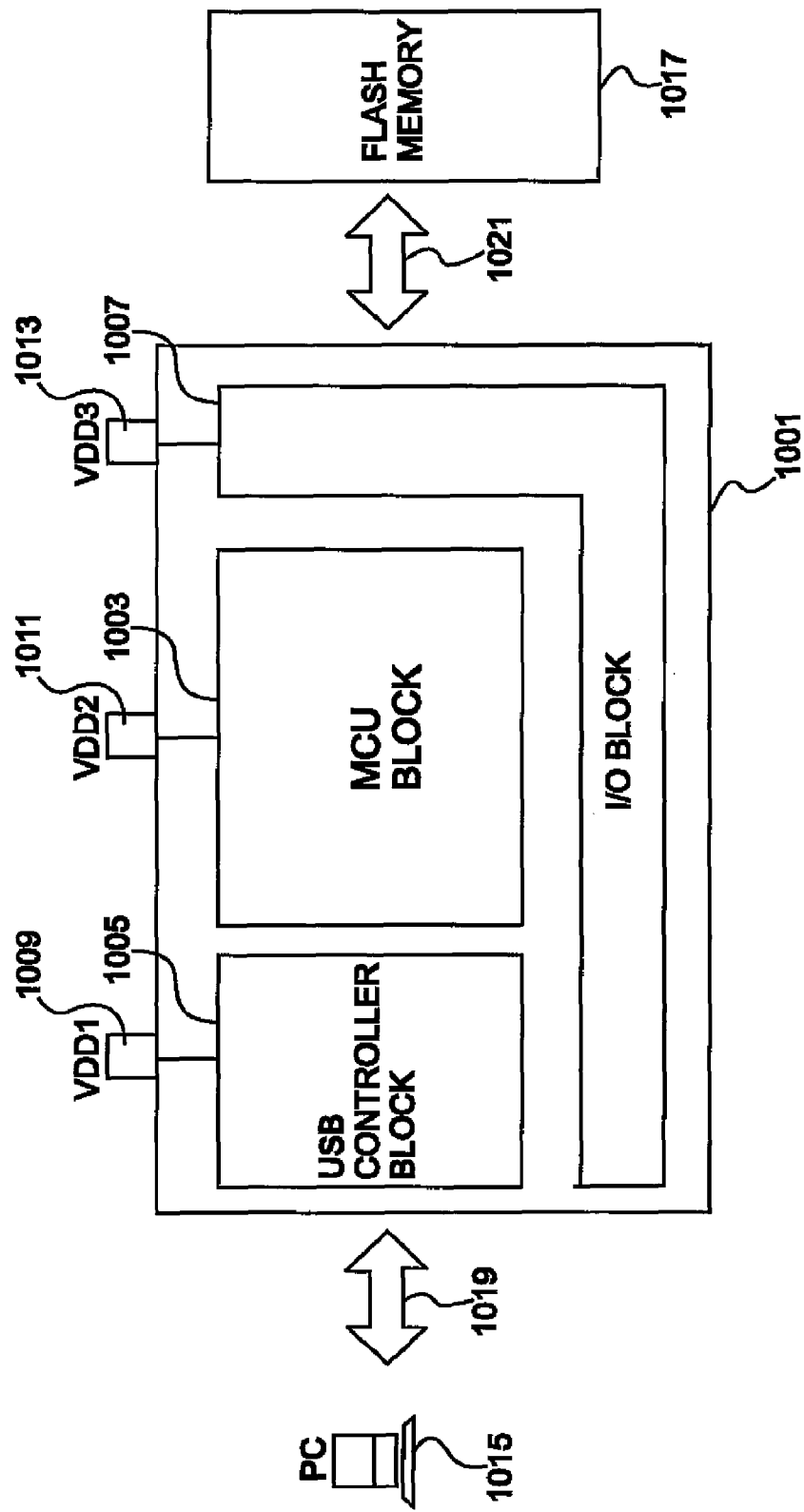
FIG. 1 is a block diagram showing an outline of the semiconductor device of the present invention.

A semiconductor device according to preferred embodiments of the present invention will be explained hereinafter with reference to figures. In order to simplify explanation, like elements are given like or corresponding reference numerals through this specification and figures. Dual explanations of the same elements are avoided.

First Preferred Embodiment

FIG. 1 is a block diagram showing an outline of the semiconductor device of the present invention.

The semiconductor device 1001 of the present invention mainly includes a MCU block 1003, a USB controller block 1005, an I/O block 1007, a power supply terminal 1009, a power supply terminal 1011, and a power supply terminal 1013.

The MCU block 1003 is connected to the power supply terminal 1011. All circuits in the MCU block 1003 operate based on the power supply voltage VDD2 supplied to the power supply terminal 1011. Here, "operating based on the power supply voltage VDD2" means that a power supply node of a circuit in the MCU block 1003 is connected to the power supply terminal 1011 and is not connected to the power supply terminal 1009 and the power supply terminal 1013. For example, if a CMOS inverter is mentioned as an example, it means that a source electrode of a PMOS transistor is connected to the power supply terminal 1011 and is not connected to the power supply terminal 1009 and the power supply terminal 1013.

The USB controller block 1005 is connected to the power supply terminal 1009. All circuits in the USB controller block 1005 operate based on the power supply voltage VDD1 supplied to the power supply terminal 1009. Here, "operating based on the power supply voltage VDD1" means that a power supply node of a circuit in the USB controller block 1005 is connected to the power supply terminal 1009 and is not connected to the power supply terminal 1011 and the power supply terminal 1013. For example, if the CMOS inverter is mentioned as an example, the source electrode of the PMOS transistor is connected to the power supply terminal 1009 and is not connected to the power supply terminal 1011 and the power supply terminal 1013.

The I/O block 1007 is connected to the power supply terminal 1013. All circuits in the I/O block 1007 operate based on the power supply voltage VDD3 supplied to the power supply terminal 1013. Here, "operating based on the power supply voltage VDD3" means that a power supply node of a circuit in the I/O block 1007 is connected to the power supply terminal 1013 and is not connected to the power supply terminal 1009 and the power supply terminal 1011. For example, if the CMOS inverter is mentioned as an example, the source electrode of the PMOS transistor is connected to the power supply terminal 1013 and is not connected to the power supply terminal 1009 and the power supply terminal 1011. Each voltage level supplied to each power supply terminal 1009, 1011, and 1013, is explained later.

One of the features of the semiconductor device 1001 of the present invention resides in that the power supply nodes of circuits in the MCU block 1003, the power supply nodes of circuits in the USB controller block 1005, and the power supply nodes of circuits in the I/O block 1007 are electrically separated from one another. Such structure is referred to as a separate power supply system hereinafter. A method for supplying power supply voltage to the semiconductor device having the separate power supply system is referred to as a separate power supply method.

The semiconductor device 1001 is connected to the PC 1015 as the host device through the USB 1019, and is also connected to the flash memory 1017 as the peripheral device through the slot or the data bus 1021. The semiconductor device 1001 controls the data transmission performed between PC 1015 and the flash memory 1017.

The MCU block 1003, the USB controller block 1005, and the I/O block 1007 are integrated into one semiconductor chip. The integrated semiconductor chip is packaged through a resin sealing process etc., and thus the semiconductor device 1001 illustrated in FIG. 1 is obtained. The MCU block 1003, the USB controller block 1005, and the I/O block 1007 do not necessarily need to be integrated into one semiconductor chip. For example, the MCU block 1003 and the I/O block 1007 may be integrated into a first semiconductor chip, and the USB controller block 1005 may be integrated into a second semiconductor chip. In this case, the first semiconductor chip and the second semiconductor chip are packaged through the resin sealing process, and thus the semiconductor device 1001 shown in FIG. 1 is obtained. An outline of the packaged semiconductor device 1001 is explained later.

Figure 2:
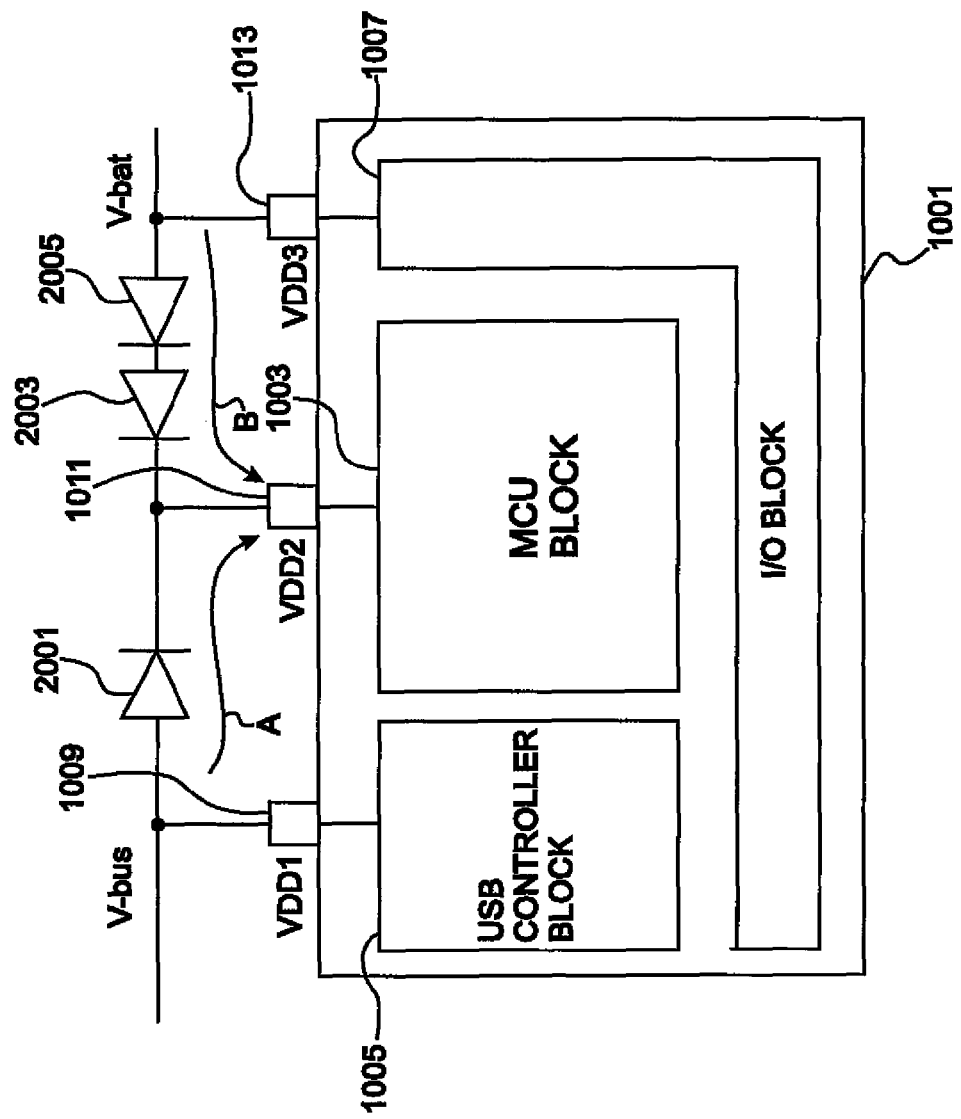
FIG. 2 is a block diagram explaining a usage example of the semiconductor device of the present invention.

FIG. 2 is a block diagram explaining a usage example of the semiconductor device 1001 of the present invention.

In FIG. 2, in order to realize the above mentioned separate power supply system, a diode 2001 serving as a voltage down converting circuit is provided between the power supply terminal 1009 and the power supply terminal 1011 as an example. Further, a diode 2003 and a diode 2005 serving as voltage down converting circuits are provided between the power supply terminal 1011 and the power supply terminal 1013 as an example.

When 3.3V is supplied to an anode of the diode 2001 and an anode of the diode 2005, 3.3V is supplied to the USB controller block 1005 and the I/O block 1007, respectively. Therefore, the USB controller block 1005 and the I/O block 1007 operate at 3.3V respectively.

On the other hand, a voltage level indicated by the expression (1) or the expression (2), whichever level is higher, appears at the power supply terminal 1011. That is, the diodes 2001, 2003, and 2005 function as switching elements each of which selects one of two power supply voltages supplied externally. "Selecting one of two power supply voltages supplied externally" means that a course A shown in FIG. 2 is selected or a course B shown in FIG. 2 is selected.

(a voltage appeared at the anode of the diode 2001)−
(forward voltage drop Vf of the diode 2001)   Expression (1)

(a voltage appeared at the anode of the diode 2005)−
(forward voltage drop Vf of the diode 2003+forward voltage drop Vf of the diode 2005)   Expression (2)

Here, it is assumed that the forward voltage drop Vf of the diode is about 0.45 V.

Now, since the voltage levels applied to the anode of the diode 2001 and the anode of the diode 2005 are 3.3V, the voltage level calculated by the above mentioned expression (1) appears at the power supply terminal 1011. (Course A is selected.) That is, 3.3V−0.45V=2.85V appears at the power supply terminal 1011. When 2.85V is supplied to the power supply terminal 1011, the MCU block 1003 operates at 2.85V. The state where power supply voltage is supplied to all of the power supply terminals 1009, 1011, and 1013 is called hereinafter a first mode.

On the other hand, when 0V is applied to the anode of the diode 2001 and 3.3V is applied to the anode of the diode 2005, the voltage level calculated by the above mentioned expression (2) appears at the power supply terminal 1011. (Course B is selected.) That is, 3.3V−(0.45V+0.45V)=2.4V appears at the power supply terminal 1011. When 2.4V is supplied to the power supply terminal 1011, the MCU block 1003 operates at 2.4V. The state where the power supply voltage is supplied to the power supply terminals 1011 and 1013, and is not supplied to the power supply terminal 1009 is called a second mode hereinafter.

The following example can be considered as a usage example of the semiconductor device 1001 illustrated in FIG. 2. The following example is a case where the semiconductor device 1001 is incorporated in the portable device, such as a digital audio player etc., and is connected to the PC serving as the host device through the USB is assumed.

An output of a first regulator which is driven by the battery and outputs the power supply voltage of 3.3V is connected to the power supply terminal 1013. An output of a second regulator which is driven by the power supply bus of the USB and outputs the power supply voltage of 3.3V is connected to the power supply terminal 1009. When the first and second regulators output 3.3V, the semiconductor device 1001 enters into the first mode.

Since the course A is selected in the first mode, the MCU block 1003 and the USB controller block 1005 operate based on the power supply voltage supplied to the power supply bus of the USB. However, a block which operates based on the electromotive force of the battery is only the I/O block 1007. The USB controller block 1005 operates according to a clock signal having relatively high frequency. However, since the power supply voltage which is applied to the USB controller block 1005 is not supplied from the battery, reducing power consumption of the battery can be achieved. In other words, since the power supply voltage applied to the power supply bus of the USB is supplied from the PC as the host device, the electromotive power of the battery is not consumed by the MCU block 1003 and the USB controller block 1005.

When the first regulator outputs 3.3V and the second regulator outputs 0V (i.e., when the semiconductor device 1001 is electrically separated from the host device), the power supply voltage from the power supply bus of the USB to the semiconductor device 1001 is cut off. Thus, the semiconductor device 1001 enters into the second mode.

Since the power supply voltage is not supplied to the power supply terminal 1009 in the second mode, the USB controller block 1005 stops its operation. In the second mode, the semiconductor device is electrically isolated from the PC as the host device. The second mode is a mode in which data transmission and reception (it is also called communication of data) between the semiconductor device 1001 and the PC are not performed. Thus, operation of the USB controller block 1005 is not required. Therefore, the power supply voltage does not need to be supplied to the power supply terminal 1009.

2.4V is supplied to the power supply terminal 1011, and 3.3V is supplied to the power supply terminal 1013. The power supply voltage supplied to the power supply terminals 1011 and 1013 are supplied from the battery through the first regulator. In addition to the I/O block 1007, in the second mode, the MCB block 1003 operates based on the electromotive power of the battery. However, the power supply voltage 2.4V of the MCU block 1003 is lower than the power supply voltage 3.3V the I/O block 1007.

Therefore, when the separate power supply system (method) based on the present invention is adopted, the power consumption of the battery can be reduced as compared with the case where the power supply voltage of the MCU block 1003 equals to the power supply voltage of the I/O block 1007.

Furthermore, when the separate power supply system (method) based on the present invention is adopted, the power supply voltage based on the electromotive power of the battery is not applied to the USB controller block 1005 which performs data transmission and reception to the host device.

Therefore, the power consumption of the battery can be more reduced as compared with a general portable device in which the power supply voltage based on the electromotive power of the battery is supplied to all circuits, such as the USB controller block, the MCU block, and the I/O block. Because, the power supply voltage is supplied only to a circuit block required for operation.

The case where the power supply voltage supplied to the power supply terminal 1009 is supplied from the power supply bus of the USB is explained as an example in the above explanations. However, the power supply voltage supplied to the power supply terminal 1009 is not limited to a voltage from the power supply bus of the USB. The power supply voltage supplied to the power supply terminal 1009 may be a power supply voltage supplied from the host device. In other words, the power supply voltage supplied to the power supply terminal 1009 may be a power supply voltage from the host device other than a battery.

In the above description, a case where the power supply voltage VDD1 supplied to the power supply terminal 1009 is set at 3.3 V and the power supply voltage VDD2 supplied to the power supply terminal 1011 is set at 2.4 V through 2.85 V and the power supply voltage VDD3 supplied to the power supply terminal 1013 is set at 3.3 is explained as an example. However, the separate power supply system (method) of the present invention is not limited to the exact value of such power supply voltage. The power supply voltages may be set so that the power supply voltage supplied to the MCU block is lower than the power supply voltage supplied to other blocks at least at the time of the second mode.

Furthermore, in FIG. 2, the diodes 2003 and 2005 are described as a means for lowering (or voltage down converting) the power supply voltage VDD3 which appears at the power supply terminal 1013 to a voltage which is lower than the power supply voltage VDD3 which appears at the power supply terminal 1011. However, the separate power supply system (method) of the present invention is not limited to the above structure.

A regulator that outputs the power supply voltage having 2.4V and 3.3V based on the electromotive power of the battery may be connected to the power supply terminal 1011 and the power supply terminal 1013. In short, the power supply voltages which satisfy the relationship of VDD2<VDD3 may be generated based on the electromotive power of the battery. However, it is desirable to provide a diode for preventing reverse current flowing between the power supply terminal 1011 and the output terminal of the regulator in this case. Such diode is connected between the power supply terminal 1011 and the output terminal of the regulator.

Figure 3:
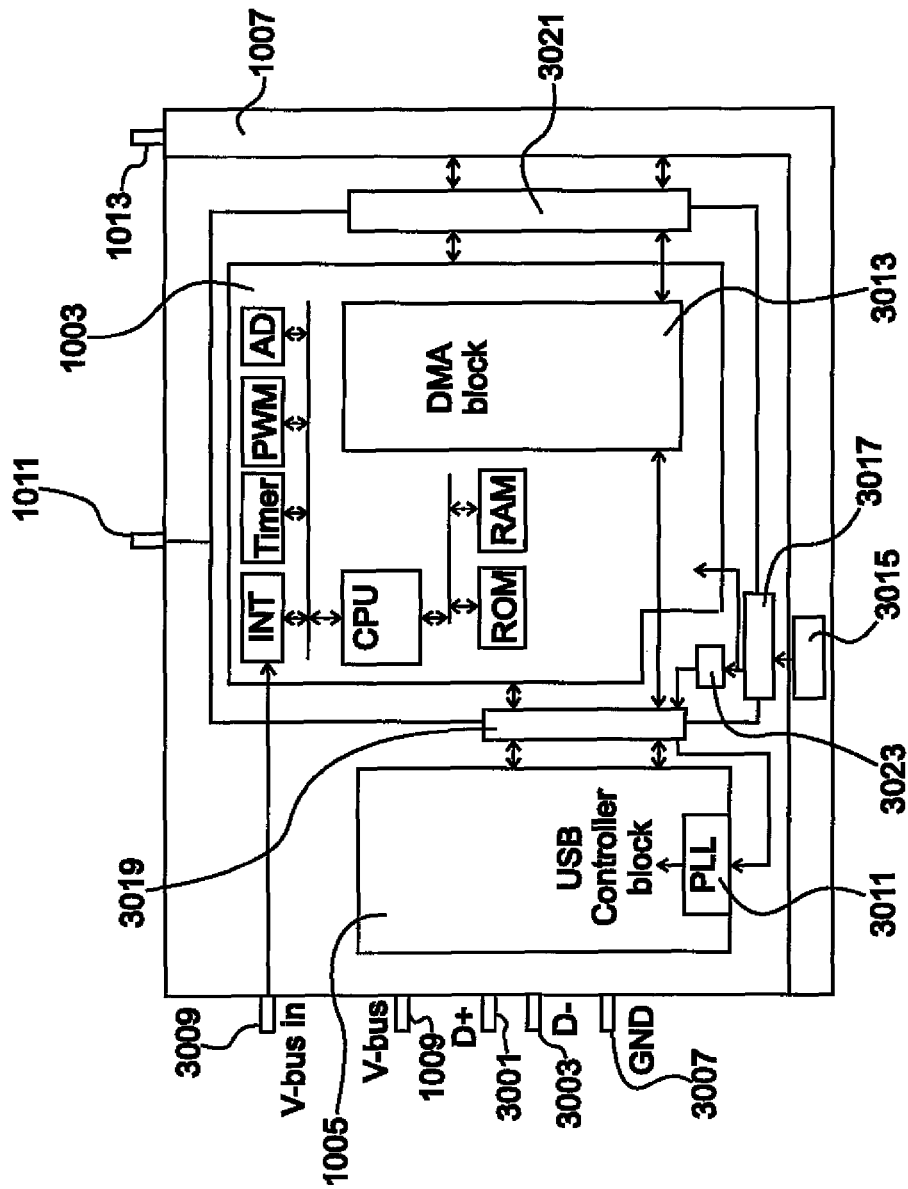
FIG. 3 is a block diagram explaining the semiconductor device shown in FIG. 1 in detail.

FIG. 3 is a block diagram showing the semiconductor device 1001 of the present invention. FIG. 3 is a block diagram explaining the semiconductor device 1001 shown in FIG. 1 in detail.

Data terminals 3001 and 3003, a ground terminal 3007 and a bus connection detection terminal 3009 are provided in the semiconductor device 1001 in addition to the power supply terminal 1009, 1011, and 1013. Although many terminals other than the above-explained terminals exist in the semiconductor device 1001, such terminals are not disclosed in order to simplify explanations.

The data terminals 3001 and 3003, the power supply terminal 1009, and the ground terminal 3007 correspond to four lines which constitute the USB. The data terminals 3001 and 3003 are connected to the USB controller block 1006.

The data terminal 3001 is a terminal which receives data D+ transferred from the host device through the first data line of the USB. Furthermore, the data terminal 3001 is also a terminal which outputs data D+ to the first data line of the USB, wherein the data D+ is a data received from the peripheral parts, such as a flash memory not illustrated, through the 110 block 1007. The data D+ output to the terminal 3001 also includes the data processed by the MCU block 1003.

The data terminal 3003 is a terminal which receives data D− transferred from the host device through the second data line of the USB. Furthermore, the data terminal 3003 is also a terminal which outputs data D− to the second data line of the USB, wherein the data D− is a data received from the peripheral parts, such as the flash memory not illustrated, through the I/O block 1007. The data D− output to the terminal 3003 may include the data processed by the MCU block 1003.

The data D+ and the data D− are complementary to each other. Therefore, one of buses in the USB, which is connected to the data terminal 3001, and another one of buses in the USB, which is connected to the data terminal 3003, are called a data bus pair.

The USB controller block 1005 has a PLL circuit 3011 which multiplies 6 MHz clock signal to 48 MHz clock signal. The USB control block 1005 receives data from the data bus pair based on an output of the PLL circuit 3011. The received data is transferred to other circuits, for example, a DMA block 3013 in the MCU block 1003, based on directions of a CPU. Furthermore, the USB controller block 1005 transfers, for example, data stored in the DMA block 3013 to the host device through the data bus pair based on directions of the CPU.

Data transmission using the USB is performed at the rate of 12 Mbps (full speed) and 1.5 Mbps (slow speed). In order to realize data transmission at such speed, it is required that the USB controller block 1005 operates on relatively high frequency such as 48 MHz.

On the other hand, since the MCU block 1003 operates at relatively low frequency such as 12 MHz, lowering power consumption of the entire semiconductor device is attained. This effect is remarkable especially in the second mode.

The MCU block 1003 consists of a CPU and peripheral circuits, such as an interrupt request generating circuit INT, a timer, a PWM, an AD converter, a ROM, a RAM, as illustrated. Since the CPU and such peripheral circuits are conventional in the art, detailed explanation is omitted. However, the explanation with respect to the interrupt request generating circuit INT is mentioned later.

The MCU block 1003 contains further Direct Memory Access block (it is called DMA block hereinafter) as the peripheral circuit. The DMA block 3013 stores temporarily data D+ and D−transferred from the USB controller block 1005, and transfers the stored data to the peripheral parts, such as the flash memory, connected to the I/O block 1007. Furthermore, the DMA block 3013 stores temporarily data transferred from the peripheral parts, such as the flash memory, connected to the I/O block 1907, and transfers the stored data to the USB controller block 1005.

Data transmission to the DMA block 3013 from the USB controller block 1005 is not performed one by one by the directions from the CPU. Therefore, the data transmission is performed at high speed. Such data transmission is known as a DMA transfer.

The MCU block 1003 has a function to generate a control signal which controls operation of the predetermined circuit in the MCU block 1003 based on data D+ and D− transferred from the USB controller block 1005.

A power supply bus 5001 (it is called Vbus), which is one of the elements of the USB, is connected to the bus connect detection terminal 3009 through the USB connector. The interrupt request generating circuit INT is connected to the terminal 3009, and monitors a potential level of the terminal 3009. By monitoring the potential level of the terminal 3009, the interrupt request generating circuit INT detects that the USB is connected to the semiconductor device 1001, and issues an interrupt request to the CPU. By the interrupt request is issued, the CPU recognizes that the semiconductor device 1001 is connected with the PC as the host device.

The I/O block 1007 has a function to output data in the semiconductor device 1001 to the flash memory as the peripheral parts, and a function to receive data from the flash memory. The I/O block 1007 mainly consists of an input or output buffer (I/O buffer). The voltage supply VDD3 of the I/O buffer can be set so as to correspond to the operation voltage of the peripheral parts independent of the power supply voltage VDD2 of the MCU block 1003 and the power supply voltage VDD1 of the USB controller block 1005. That is, the separate power supply system (method) is adopted in the semiconductor device 1001.

Specifically, since the operation voltage of the flash memory as the peripheral part is 3.3V, 3.3V can be supplied to the I/O buffer.

An oscillation circuit 3015 is provided in the I/O block 1007. The oscillation circuit 3015 generates a 12 MHz-oscillation signal, and outputs the clock signal based on the oscillation signal. This clock signal is outputted to the MCU block 1093 through a level shifter 3017. The MCU block 1003 operates based on the 12 MHz-clock signal. The 12 MHz-clock signal is supplied to a ½ dividing circuit 3023, and is divided into a 6 MHz clock signal. The 6 MHz clock signal is transferred to the PLL circuit 3011 in the USB controller block 1005 through the level shifter 3019. The PLL circuit 3011 multiplies the 6 MHz clock signal by eight, and thus outputs a 48 MHz-clock signal. The USB controller block 1005 operates based on this 48 MHz-clock signal.

The level shifter 3019 is provided between the USB controller block 1005 and the MCU block 1003. Level shifters 3017 and 3021 are provided between the MCU block 1003 and the I/O block 1007. That is, the level shifter must be provided between two blocks which are operated at different power supply voltages. This is a conventional technology in this technical field.

However, a special level shifter is adopted in the semiconductor device 1001 of the present invention. Especially, a special structure is required for the level shifter 3019. Because, when the USB is connected to the semiconductor device 1001, the USB controller block 1005 receives the power supply voltage via the power supply bus of the USB, and when the USB is removed from the semiconductor device 1001, supplying a power supply voltage to the semiconductor device 1001 is cut off. Therefore, a special level shifter which performs not only shifting a voltage level, but executes a predetermined process when cutting off the power supply voltage is required.

Figure 4:
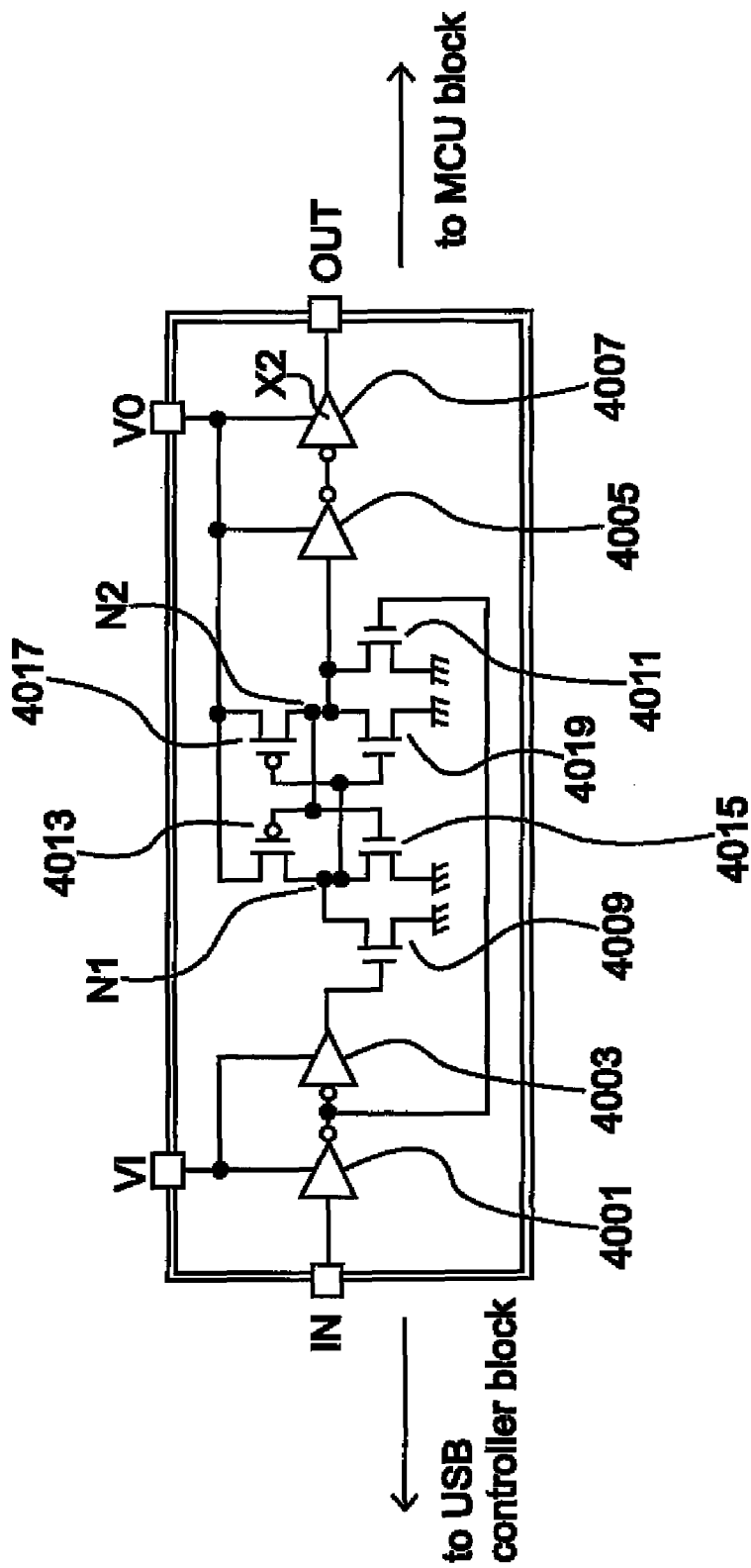
FIG. 4 is a detailed circuit diagram of a level shifter.

FIG. 4 is a detailed circuit diagram of the level shifter 3019.

The level shifter 3019 has inverters 4001, 4003, 4005, and 4007. The power supply nodes of inverters 4001 and 4003 are connected to the power supply terminal VI connected to the power supply terminal 1009, and the power supply nodes of inverters 4005 and 4007 are connected to the power supply terminal VO connected to the power supply terminal 1011.

Furthermore, the level shifter 3019 has an input terminal IN which receives data from the USB controller block 1005, and an output terminal OUT which outputs data to the MCU block 1003.

Furthermore, the level shifter 3019 has an inverter INV1 which consisted of a PMOS 4013 and an NMOS 4015, and an inverter INV2 which consisted of a PMOS 4017 and an NMOS 4019. These inverters INV1 and INV2 are cross-coupled to each other, and they constitute a latch circuit. Furthermore, the level shifter 3019 has an NMOS 4009 connected to a node Ni, and an NMOS 4011 connected to a node N2.

Since the power supply nodes of the inverters 4001 and 4003 are supplied with VDD1 which is the operation power supply voltage of the USB controller block 100, the inverters 4001 and 4003 operate at the power supply voltage of 3.3V. Therefore, inverters 4001 and 4003 output a logic L level of 0V, and a logic H level of 3.3V.

Since the power supply nodes of the inverters 4005 and 4007 is supplied with the VDD2 which is the operation power supply voltage of the MCU block 1003, the inverters 4005 and 4007 operate at 2.85 V in the first mode and operate at 2.4 V in the second mode. Therefore, the inverters 4001 and 4003 output the logic L level of 0V and the logic H level of 2.85V in the first mode, and output the logic L level of 0V and the logic H level of 2.4V in the second mode.

Next, operation of the level shifter 3019 is explained.
(When the semiconductor device 1001 is in the first mode)

When a signal having the logic H level (3.3V) is applied to the input terminal IN from the USB controller block 1005, the NMOS 4009 enters into an ON state and thus the node N1 goes to 0V. When the node N1 goes to 0V, the PMOS 4017 enters into the ON state. Thus, the node N2 is changed to the logic H level of 2.85V. When the node N2 goes to the logic H level, the output terminal OUT is set to the logic H level. Moreover, when the node N2 is set to the logic H level, the NMOS 4015 enters into the ON state. As a result, the logic H level of 3.3V outputted from the USB controller block 1005 is transferred to the MCU block 1003 as the logic H level of 2.85V.
(When the Semiconductor Device 1001 is in the Second Mode)

In the above-mentioned state, if the semiconductor device 1001 is removed from the host device, the power supply voltage from the host device is cut off. That is, the semiconductor device 1001 enters into the second mode. If the semiconductor device 1001 enters into the second mode, the level of the power supply terminal VI goes to a floating state. However, the power supply voltage 2.4V is supplied to the inverters INV1 and INV2 which constitute the latch circuit from the power supply terminal VO. Therefore, the logic H level outputted from the USB controller block 1005 at the time of the first mode is memorized in this latch circuit. Thus, the logic H level of the output terminal OUT is maintained.

If the level shifter 3019 has only a function to perform a mere level shift, the level of the output terminal OUT become floating level at the time of the second mode. As a result, unnecessary through current occurs at the circuit in the MCU block 1003 which receives the floating level. Thus, current consumption increases.

By adopting the level shifter of the present invention, current consumption of the USB controller block 1005 can be cut off completely. Consequently, current consumption of the entire semiconductor device 1001 can be reduced.

Two or more level shifters of the structure as shown in FIG. 4 are provided. Moreover, a level shifter having an input terminal IN connected to the MCU block 1003, an output terminal OUT connected to the USB controller block 1005, a power supply terminal VI connected to the power supply terminal 1011, and a power supply terminal VO connected to the power supply terminal 1009 is also provided as the level shifter 3019. It is because data is transferred to both directions between the MCU block 1003 and the USB controller block 1005.

Figure 5:
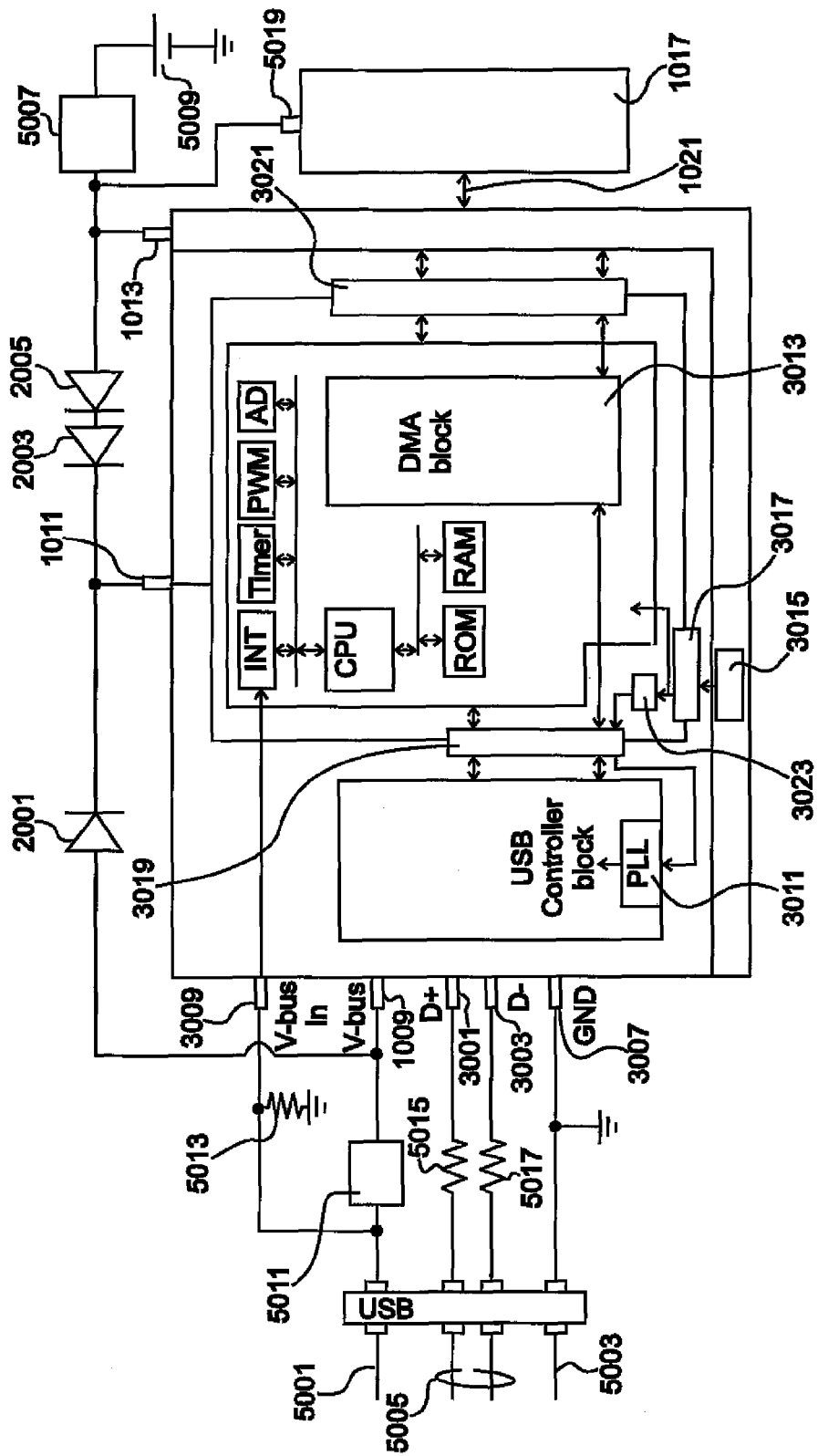
FIG. 5 is a block diagram showing an example which applies the semiconductor device of the present invention to a digital audio player.

FIG. 5 is a block diagram showing an example which applies the semiconductor device 1001 of the present invention to the digital audio player.

In FIG. 5, all structure elements except for a flash memory as the peripheral parts, a battery 5009 having the electromotive power of 1.5V, and USB which comprised of a power supply bus 5001, a ground voltage bus 5003, and a data bus pair, are mounted on a mounting board not illustrated. The mounting board is built in the digital audio player.

The flash memory 1017 can be put on and taken off a slot 1021. The battery 5009 can be also put on and taken off the box for batteries not illustrated. The USB is the form of a cable that can be put on and taken off the USB connector.

A regulator 5011 which converts the power supply voltage of 5V supplied from the USB into 3.3V is connected between the power supply terminal 1009 and the terminal of the USB connected corresponding to the power supply bus 5001. The bus connection detection terminal 3009 and the terminal of the USB corresponding to the power supply bus 5001 are connected by wiring formed on the mounting board, and this wiring is grounded through resistive element 5013 having 1M ohm. That is, the bus connection detection terminal 3009 is pull downed by the resistive element 5013.

A resistive element 5015 having 22 ohm is connected between the data terminal 3001 and the USB connector. A resistive element 5017 having 22 ohm is connected between the data terminal 3003 and the USB connector.

The ground terminal 3007 and the terminal of the USB corresponding to the ground bus 5003 are connected by relatively thicker wiring than other wirings formed on the mounting board. This relatively thicker wiring is grounded. The reason for using thicker wiring than other wirings is for noise reduction.

The diode 2001 serving as a power supply voltage down converter element is connected between the power supply terminal 1009 and the power supply terminal 1011. The diodes 2003 and 2005 serving as power supply voltage down converter element are connected in series between the power supply terminal 1011 and the power supply terminal 1013.

A regulator 5007 which changes the voltage of 1.5V supplied from a battery 5009 into 3.3V is connected between the power supply terminal 1013 and the battery 5009. An output of the regulator 5007 is supplied also to the power supply terminal 5019 of the flash memory 1017.

Figure 6:
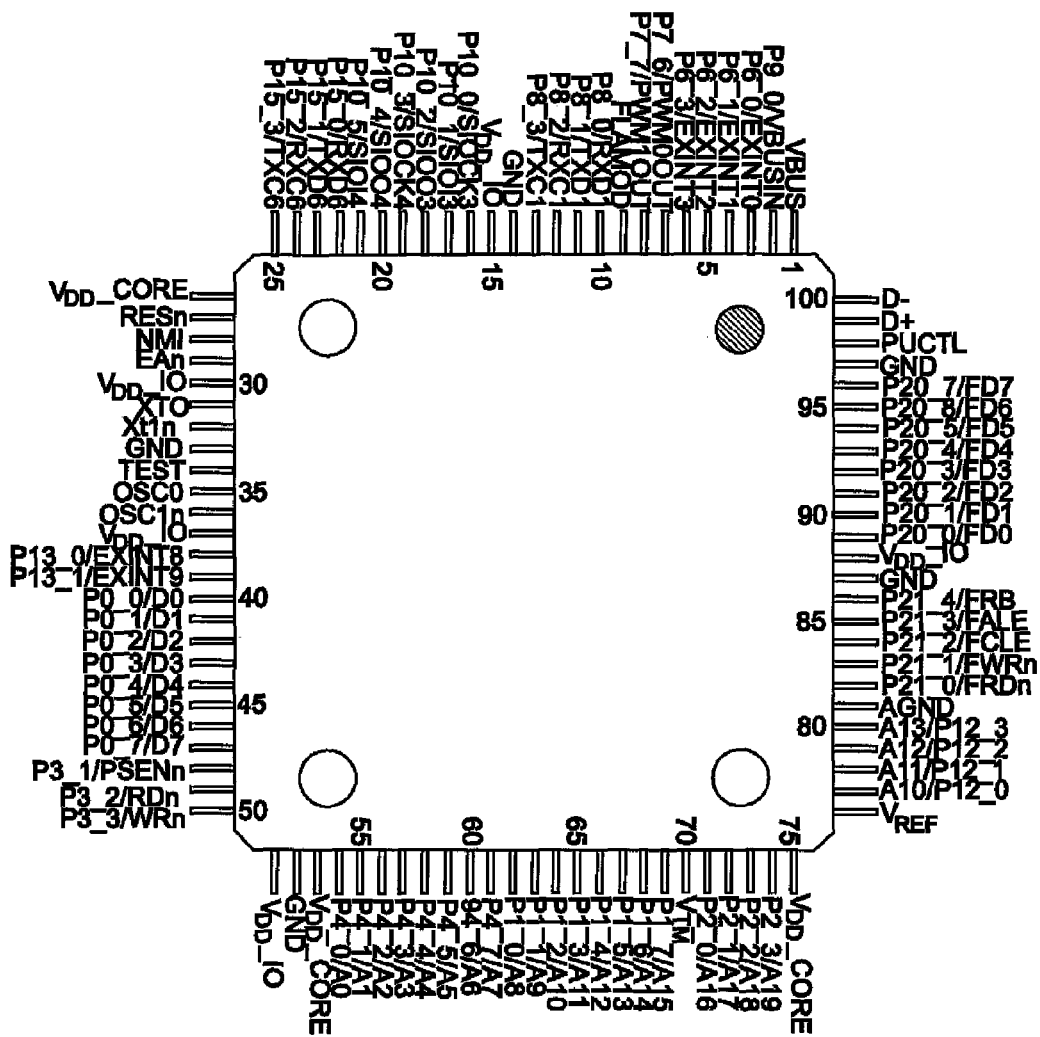
FIG. 6 is an outline showing the semiconductor device.

FIG. 6 is an outline showing the semiconductor device 1001.

In FIG. 6, a terminal with which "VBUS" is given corresponds to the power supply terminal 1009 of FIG. 5. A terminal with which "P9 0/VBUSIN" is given corresponds to the bus connection detection terminal 3009 of FIG. 5. A terminal with which "D+" is given corresponds to the data terminal 3001 of FIG. 5. A terminal with which "D−" is given corresponds to the data terminal 3003 of FIG. 5. A terminal with which "VDD CORE" is given corresponds to the power supply terminal 1011 of FIG. 5. A terminal with which "VDD IO" is given corresponds to the power supply terminal 1013 of FIG. 5. In FIG. 6, although a plurality of terminals with which "VDD CORE" is given exist, these terminals are commonly connected inside, the semiconductor device 1001. Although a plurality of terminals with which "VDD IO" is given exist, these terminals are commonly connected inside the semiconductor device 100 as well.

An operation where the above mentioned digital player is connected to the PC as the host device through the USB cable (the first mode) is easily understood by explanation mentioned above. Furthermore, an operation where the above mentioned digital player is removed from the USB cable, and can be used in a place far from the PC (the second mode) is also easily understood by the above explanations.

Second Preferred Embodiment

Figure 7:
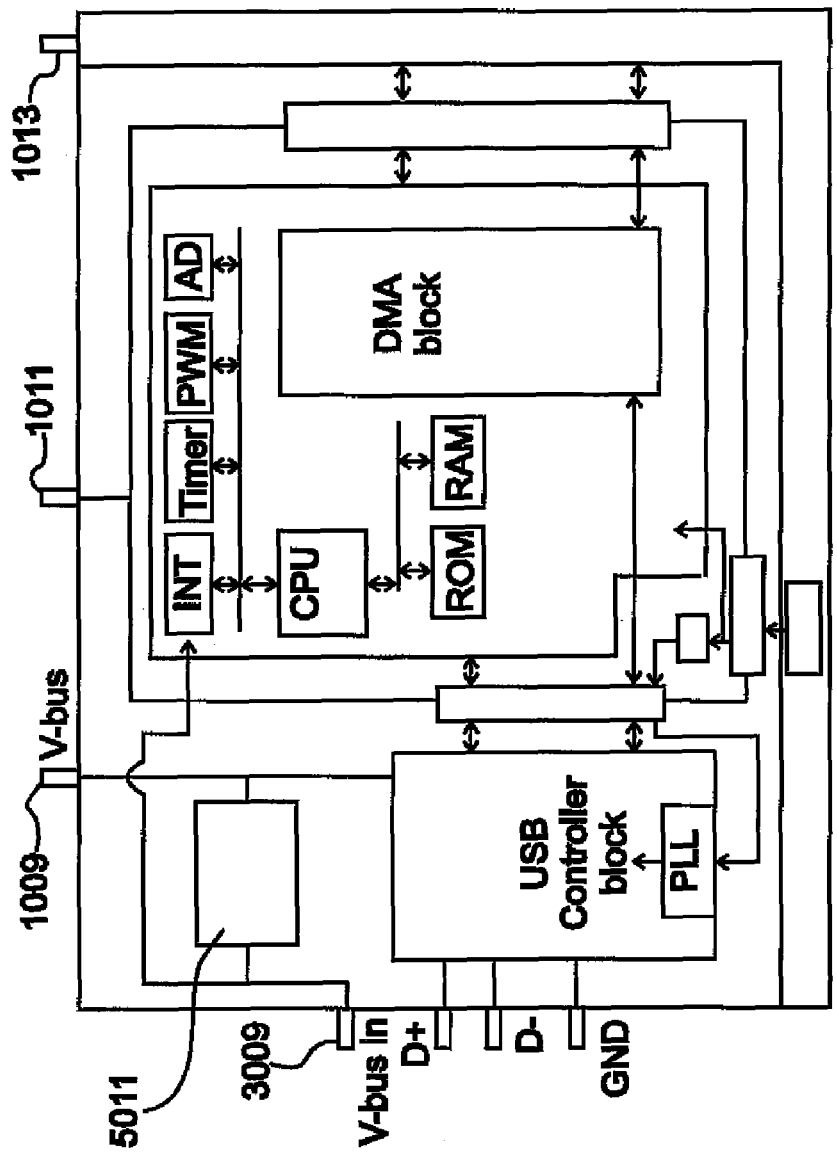
FIG. 7 is a block diagram showing a semiconductor device according to a second preferred embodiment of the present invention.

FIG. 7 is a block diagram showing a semiconductor device 1001 according to a second preferred embodiment of the present invention.

The difference between the second preferred embodiment and the first preferred embodiment resides in that the regulator 5011 which converts the power supply voltage of 5V supplied from the USB into 3.3V is built in the semiconductor device 1001. Since other structure elements of the semiconductor device 1001 are substantially the same as that of the first preferred embodiment, explanations as to the other structure elements are omitted.

Figure 8:
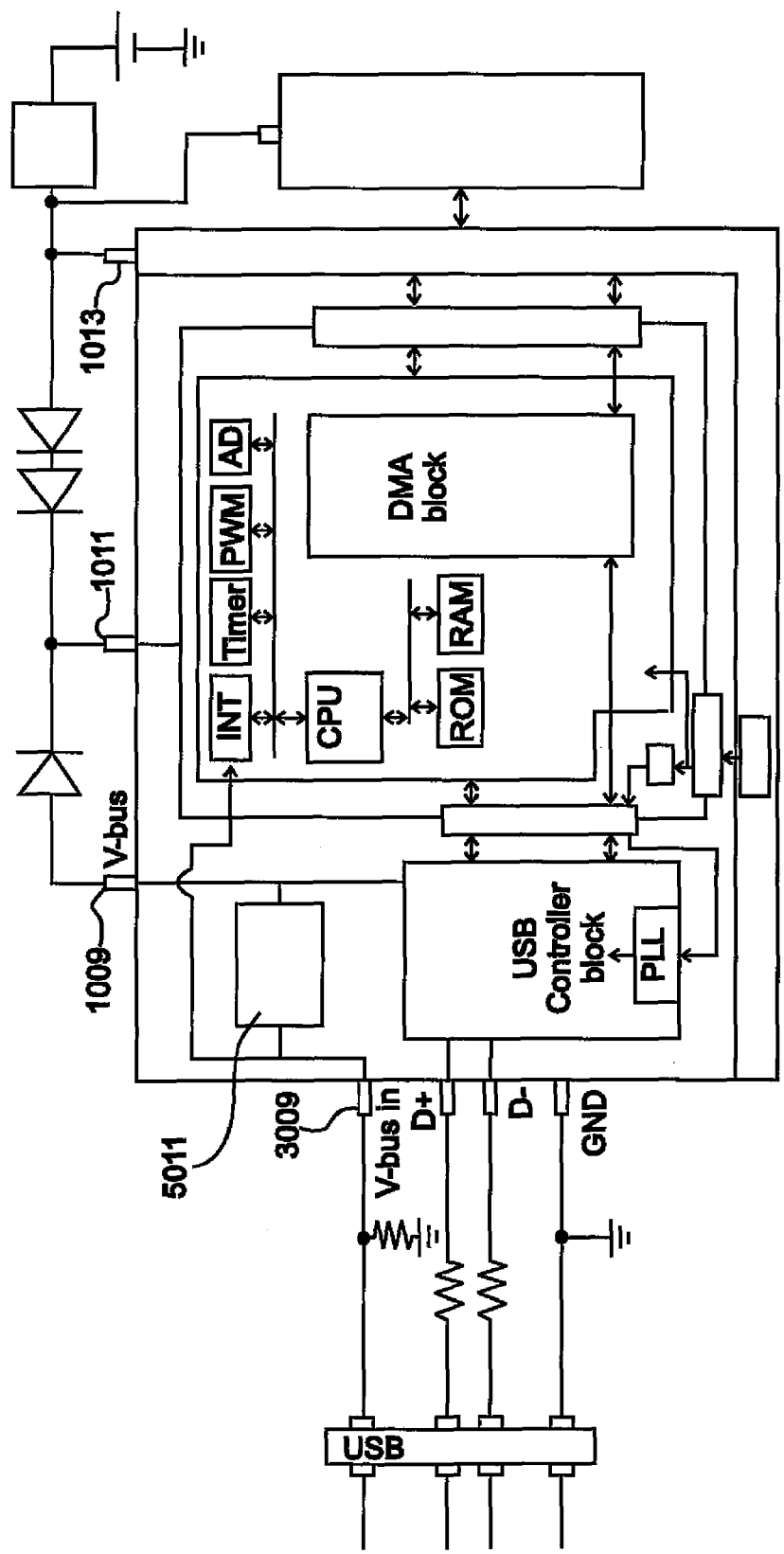
FIG. 8 is a block diagram showing an example which applies the semiconductor device of the present invention to a digital audio player.

FIG. 8 is a block diagram showing an example which applies the semiconductor device 1001 of the present invention to the digital audio player. An operation of the digital audio player shown in FIG. 8 is easily understood by explanation of the example of application shown in FIG. 5.

The outline of the effect obtained by one of the present inventions is explained briefly as follows.

That is, according to the semiconductor device of the present invention, it is possible to supply independent power supply voltages to each circuit block, wherein circuit block includes a first circuit block receiving data outputted from a host device, a second circuit block receiving data outputted from peripheral device, and a third circuit block controlling operation of the first circuit block and the second circuit block. Therefore, the semiconductor device that can satisfy the operation voltage required by circuit blocks and can minimize consumption of a battery.

While the preferred form of the present invention has been described, it is to be understood that modifications will be apparent to those skilled in the art without departing from the spirit of the invention. The scope of the invention is to be determined solely by the following claims.

What is claimed is:

1. A semiconductor device comprising:
a first terminal which is connectable to a host device;
a second terminal which is connectable to a peripheral device;
a first power supply terminal supplied with a first power supply voltage;
a second power supply terminal supplied with a second power supply voltage;
a first circuit block connected to the first terminal, the first circuit block receiving a data from the host device;
a second circuit block connected to the second terminal and the second power supply terminal, the second circuit block receiving a data from the peripheral device based on the second power supply voltage; and
a third circuit block connected to the first power supply terminal;
wherein the third circuit block operates based on the first power supply voltage lower than the second power supply voltage while the first terminal is disconnected from the host device.

2. The semiconductor device according to claim 1, wherein the first circuit block is controlled by the third circuit block.

3. The semiconductor device according to claim 2, wherein the second power supply voltage is supplied from a battery which operates the peripheral device.

4. The semiconductor device according to claim 3, further comprising a voltage down converting circuit connected between the first power supply terminal and the second power supply terminal so as to generate the first power supply voltage based on the second power supply voltage.

5. The semiconductor device according to claim 1, wherein the second circuit block is input/output circuit and the peripheral device is a flash memory.

* * * * *